United States Patent
Ogawa et al.

(10) Patent No.: US 11,152,632 B2
(45) Date of Patent: Oct. 19, 2021

(54) FUEL CELL SYSTEM AND CONTROL METHOD

(71) Applicant: TOYOTA JIDOSHA KABUSHIKI KAISHA, Toyota (JP)

(72) Inventors: Tomohiro Ogawa, Miyoshi (JP); Kenji Umayahara, Miyoshi (JP); Ryota Kawaguchi, Toyota (JP); Yuji Murata, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/793,002

(22) Filed: Feb. 18, 2020

(65) Prior Publication Data
US 2020/0280082 A1    Sep. 3, 2020

(30) Foreign Application Priority Data

Mar. 1, 2019 (JP) .............................. JP2019-037658

(51) Int. Cl.
| | |
|---|---|
| *H01M 8/04223* | (2016.01) |
| *H01M 8/04007* | (2016.01) |
| *H01M 8/04828* | (2016.01) |
| *H01M 8/04992* | (2016.01) |
| *H01M 8/0432* | (2016.01) |
| *H01M 8/04955* | (2016.01) |

(52) U.S. Cl.
CPC ..... *H01M 8/04253* (2013.01); *H01M 8/0432* (2013.01); *H01M 8/04067* (2013.01); *H01M 8/04828* (2013.01); *H01M 8/04955* (2013.01); *H01M 8/04992* (2013.01)

(58) Field of Classification Search
CPC ......... H01M 8/04067; H01M 8/04179; H01M 8/04253; H01M 8/043; H01M 8/0432; H01M 8/04358; H01M 8/04828; H01M 8/04955; H01M 8/04992; H01M 8/249; H01M 2250/20; Y02E 60/50; Y02T 90/40

See application file for complete search history.

(56) References Cited

U.S. PATENT DOCUMENTS

| | | | |
|---|---|---|---|
| 2017/0187053 A1* | 6/2017 | Hoshi | H01M 8/04373 |
| 2017/0237092 A1* | 8/2017 | Ogawa | H01M 8/04373 |
| | | | 429/9 |

FOREIGN PATENT DOCUMENTS

JP    2017147047 A    8/2017

* cited by examiner

*Primary Examiner* — Brittany L Raymond
(74) *Attorney, Agent, or Firm* — Dickinson Wright, PLLC

(57) ABSTRACT

A fuel cell system is equipped with a plurality of subsystems. Each of the plurality of the subsystems is equipped with a fuel cell stack, a temperature sensor, a scavenging device, and a control unit. The control unit of that one of the subsystems having the fuel cell stack whose temperature is specified as being the lowest among the plurality of the subsystems when the fuel cell system is stopped from operating performs scavenging control including a determination on the carrying out of scavenging in the subsystem and the issuance of a command to carry out scavenging to all the subsystems in accordance with the determination.

10 Claims, 10 Drawing Sheets

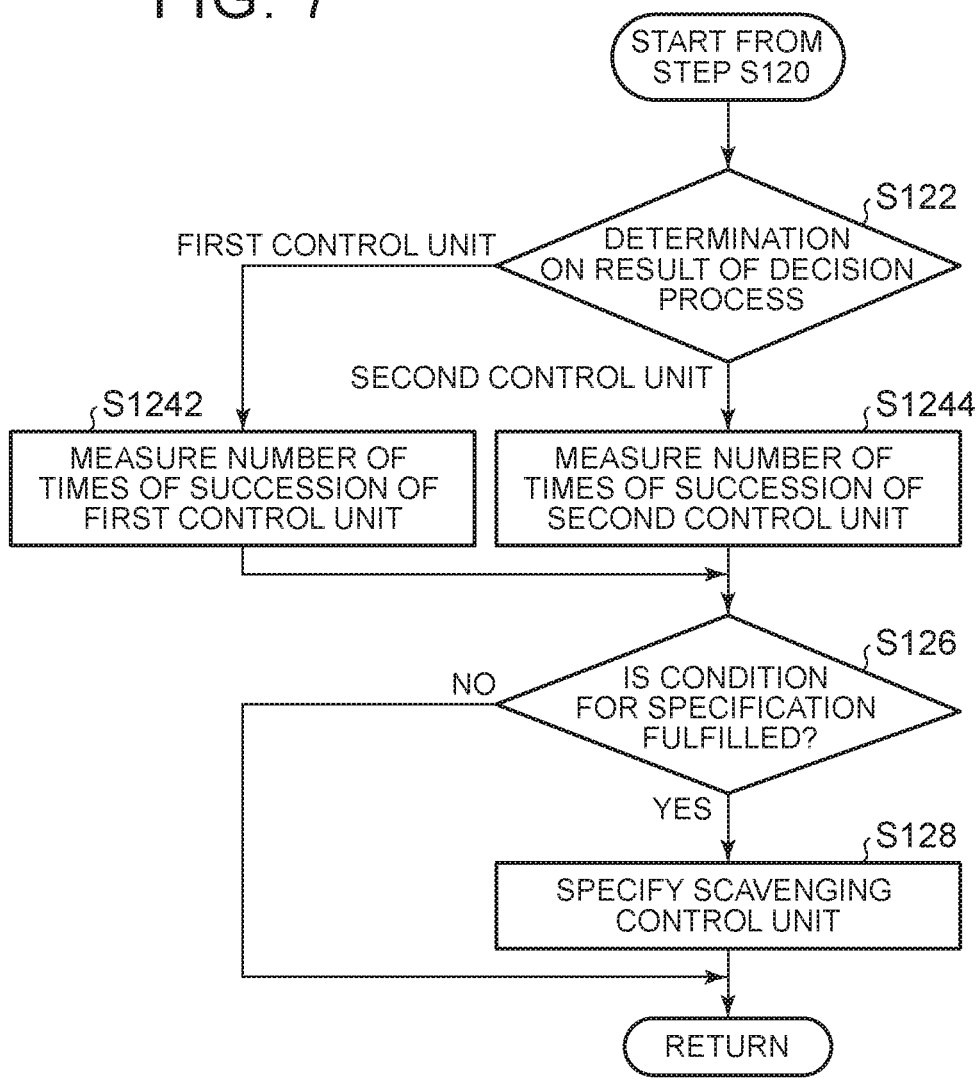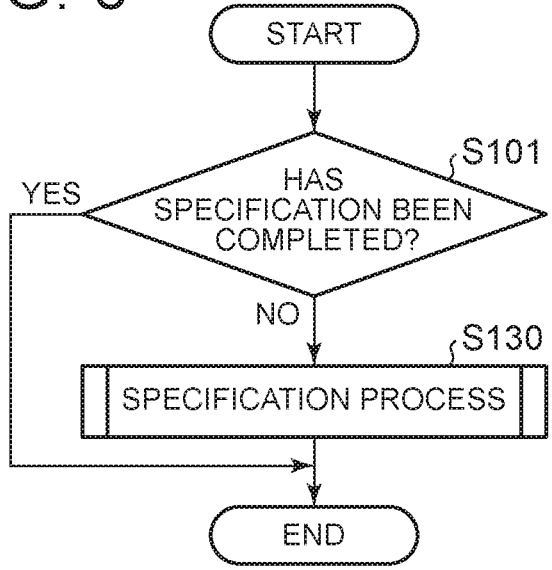

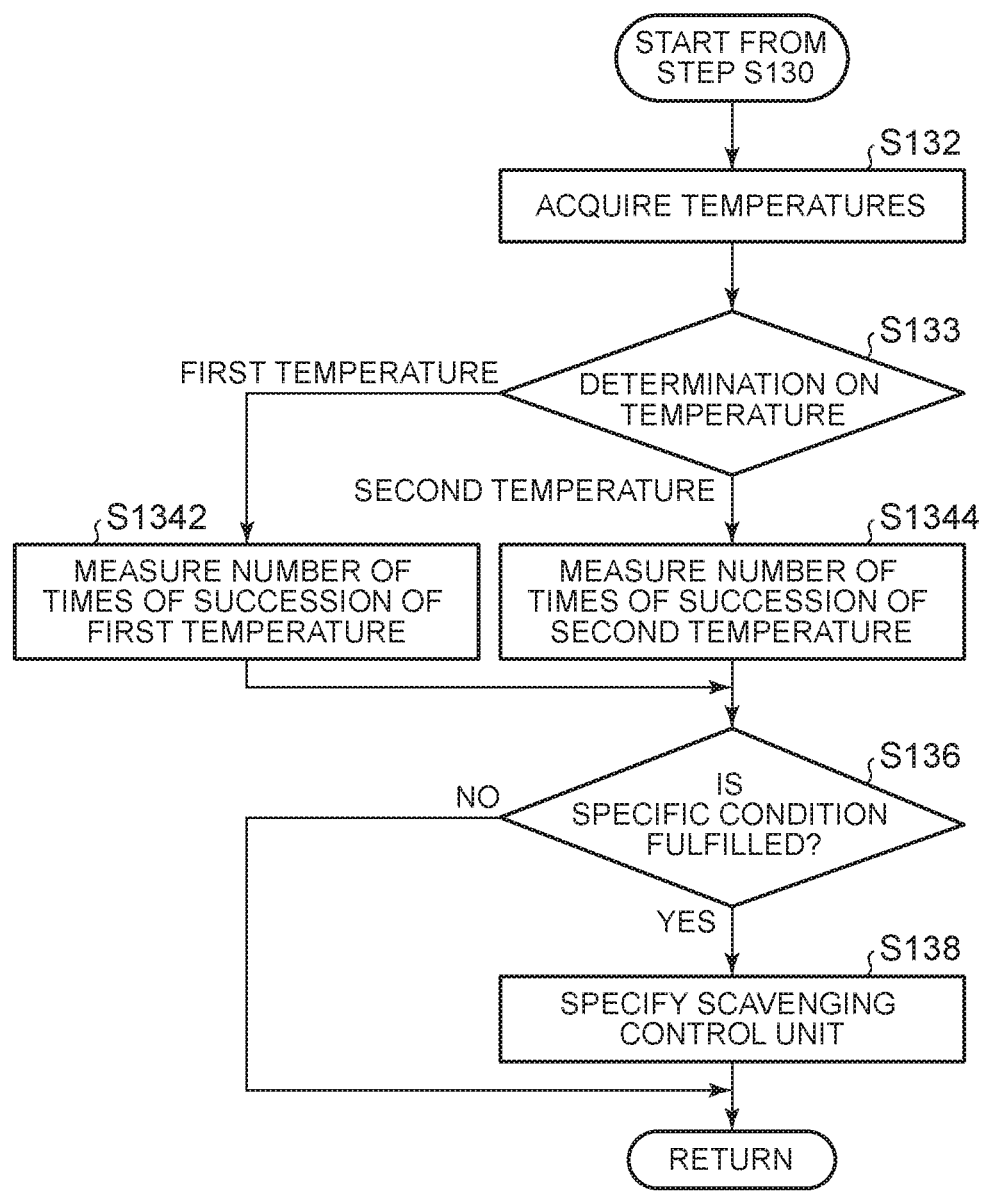

FUEL CELL SYSTEM AND CONTROL METHOD

INCORPORATION BY REFERENCE

The disclosure of Japanese Patent Application No. 2019-037658 filed on Mar. 1, 2019 including the specification, drawings and abstract is incorporated herein by reference in its entirety.

BACKGROUND

1. Technical Field

The present disclosure relates to a fuel cell system and a control method.

2. Description of Related Art

In a fuel cell system, there is known an art of performing a scavenging process during stoppage of the fuel cell system to restrain residual water in fuel cells and peripheral components from freezing due to a fall in outside air temperature (e.g., Japanese Patent Application Publication No. 2017-147047 (JP 2017-147047 A)). This fuel cell system detects a fall in outside air temperature that can occur during stoppage of the fuel cell system, and performs the scavenging process.

SUMMARY

In recent years, a fuel cell system may be mounted with a plurality of subsystems that are equipped with fuel cell stacks respectively. The inventor has found out that, in this fuel cell system mounted with the plurality of the subsystems, the temperature of residual water in the fuel cells and the peripheral components may change differently among the subsystems even if the fuel cell system is placed in the same environment. Therefore, when the scavenging process is uniformly performed on the plurality of the subsystems, the timing when the scavenging process is performed may not be appropriate in a certain one or certain ones of the subsystems.

The present disclosure has been made to solve the above-mentioned problem, and can be realized in the following modes.

According to one mode of the present disclosure, there is provided a fuel cell system. This fuel cell system includes a plurality of subsystems that are each equipped with a fuel cell stack having an anode and a cathode, a temperature sensor that acquires a temperature of the fuel cell stack, a scavenging device that scavenges at least one of the anode and the cathode, and a control unit that can command the scavenging device to carry out scavenging. The control unit of that one of the subsystems having the fuel cell stack whose temperature is specified as being the lowest among the plurality of the subsystems when the fuel cell system is stopped from operating performs scavenging control including a determination on carrying out of scavenging in the subsystem and issuance of a command to carry out scavenging to all the subsystems in accordance with the determination. According to the fuel cell system of this mode, the control unit of the subsystem having the fuel cell stack whose temperature has been specified as being the lowest among the plurality of the subsystems performs the scavenging control including the determination on the carrying out of scavenging in the subsystem, and the issuance of the command to carry out scavenging to all the subsystems in accordance with the determination. Accordingly, this fuel cell system can reduce the possibility of the scavenging process not being performed at an appropriate timing, even in the case where the timings when residual water, for example, produced water in the fuel cell stacks freezes are different among the subsystems due to the differences among the environments in which the subsystems are used respectively.

The fuel cell system of the aforementioned mode may be further equipped with a decision unit that performs a decision process for deciding the control unit of the subsystem having the fuel cell stack whose temperature is the lowest among the plurality of the subsystems when the fuel cell system is stopped from operating. The control unit decided by the decision unit among the respective control units of the plurality of the subsystems may perform the scavenging control. According to this mode, the possibility of the scavenging process not being performed at an appropriate timing can be reduced even when the environments in which the subsystems are used respectively may be different every time the fuel cell system is stopped.

In the aforementioned mode, the decision unit may be provided in the control unit of one of the plurality of the subsystems. According to this mode, there is no need to provide the decision unit separately.

The fuel cell system of the aforementioned mode may be further equipped with a storage unit that can be accessed by the decision unit and the control units of the respective subsystems. Upon fulfillment of a condition that the control unit of that one of the subsystems is continuously decided through the decision process, the decision unit may store into the storage unit information specifying which one of the subsystems the control unit belongs to. The control unit of the subsystem that is specified by the information may continuously perform the scavenging control when the information is stored in the storage unit. According to this mode, in the case where the information for specification is stored in the storage unit, the control unit of the specified subsystem can continuously perform the scavenging control, so there is no need to make a decision when the fuel cell system is stopped after specification. Accordingly, in this fuel cell system, the load applied to the decision unit in stopping the fuel cell system, and the amount of energy consumption can be reduced.

In the aforementioned mode, the fuel cell system may be further equipped with a specification unit that performs a specification process for specifying the control unit of the subsystem having the fuel cell stack whose temperature is the lowest among the plurality of the subsystems when the fuel cell system is stopped from operating, and a storage unit that can be accessed by the specification unit and the control units of the respective subsystems. Upon fulfillment of a condition that the control unit of that one of the subsystems is specified through the specification process, the specification unit may store into the storage unit information specifying which one of the subsystems the control unit belongs to. The control unit of the subsystem that is specified by the information may perform the scavenging control when the information is stored in the storage unit. According to this mode, in the fuel cell system, the specified control unit performs the scavenging control when the condition for specification is fulfilled. Accordingly, the amount of energy consumption can be made smaller than in the case where all the control units perform the scavenging control.

In the aforementioned mode, each of the control units of the plurality of the subsystems may make a determination on the carrying out of scavenging in the subsystem equipped with the control unit itself, and command only the scavenging device of the subsystem to carry out scavenging. According to this mode, the fuel cell system can adjust the timings of scavenging in the plurality of the subsystems respectively, when the condition for specification is not fulfilled.

In the aforementioned mode, the control units of the plurality of the subsystems may store into the storage unit additional information as information on the carrying out of scavenging, every time a command to carry out the scavenging is issued. The specification unit may determine whether or not the condition for specification by the specification process is fulfilled, through the use of the temperatures of the fuel cell stacks and the additional information. According to this mode, the accuracy in determining whether or not the condition for specification has been fulfilled can be made higher than in the case where only the temperatures of the fuel cell stacks are used.

In the aforementioned mode, the decision unit may be provided in the control unit of one of the plurality of the subsystems. According to this mode, there is no need to provide the decision unit separately.

In the aforementioned mode, the information stored in the storage unit may be deleted when a condition determined in advance is fulfilled. According to this mode, the possibility of the scavenging process not being performed at an appropriate timing can be reduced even in the case where the environment has changed after specification. The present disclosure can be realized in various modes other than the above-mentioned fuel cell system. For example, the present disclosure can be realized in a mode of a method of controlling the above-mentioned fuel cell system, a control program for the fuel cell system, a mobile object such as a fuel cell-powered vehicle, a ship, an airplane or the like that is equipped with the fuel cell system, or a stationary facility such as a house, a building or the like that is equipped with the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart showing the contents of the specification process as step S120;

FIG. 8 is a flowchart showing the contents of a decision/specification process in the third embodiment;

FIG. 9 is a flowchart showing the contents of a specification process (step S130) that is performed in the third embodiment;

DETAILED DESCRIPTION OF EMBODIMENTS

A. Embodiments

A1. Outline of Fuel Cell System

Figure 1:
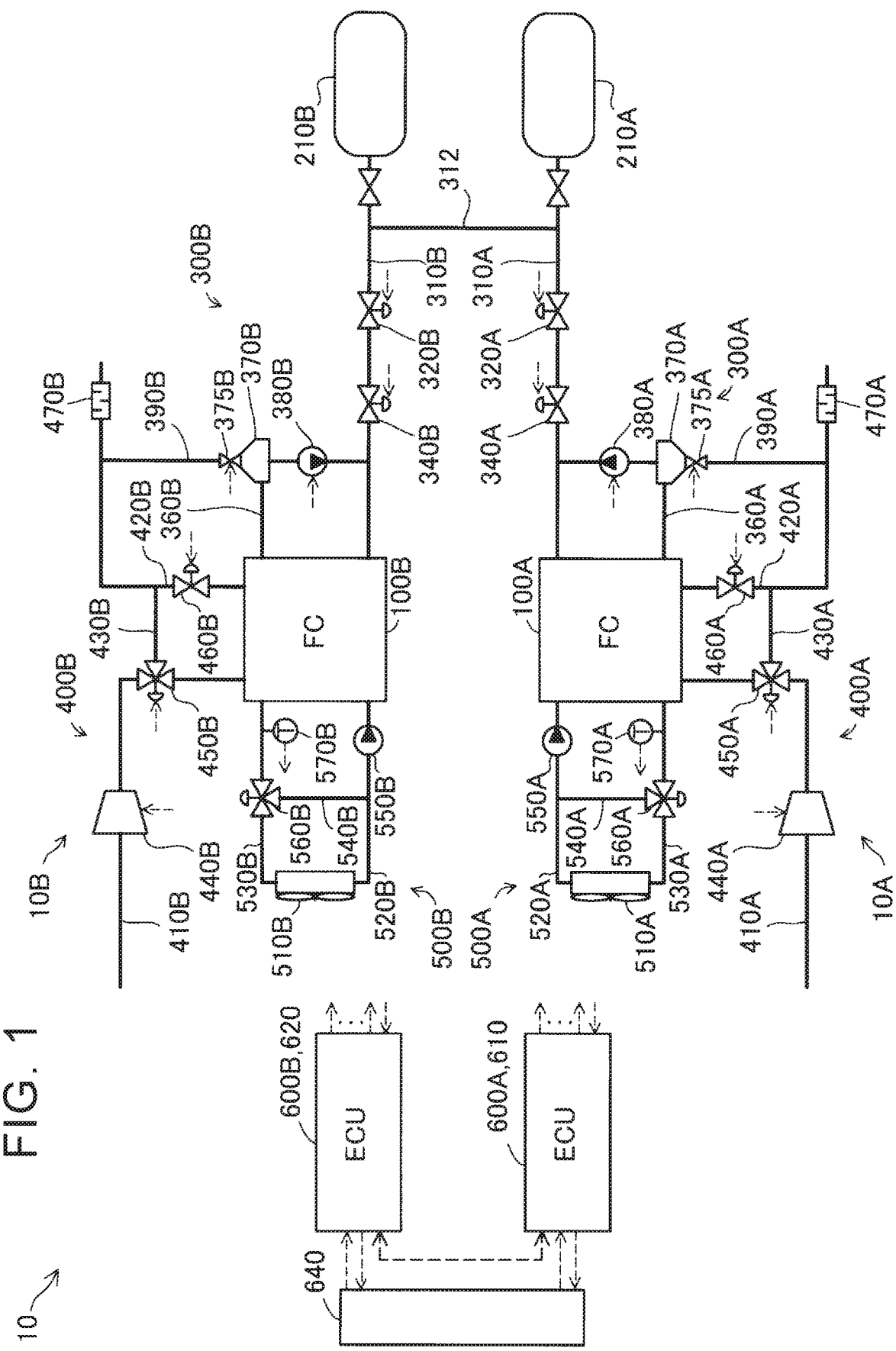
FIG. 1 is a schematic view of a fuel cell system according to each of the embodiments.

FIG. 1 is a schematic view of a fuel cell system 10 according to each of the embodiments. The fuel cell system 10 is equipped with a first subsystem 10A and a second subsystem 10B, and generates electric power through a reaction between fuel gas (anode gas) and oxidant gas (cathode gas). The two subsystems 10A and 10B are similar in configuration to each other, and are operated in synchronization with each other in a normal operation state. The fuel cell system 10 is mounted in, for example, a large vehicle (a large automobile) such as a fuel cell-powered bus or the like, and is used as an electric power generation device that actuates a drive motor and various auxiliaries. In the present embodiment, the fuel cell system 10 is mounted in a fuel cell-powered vehicle as a fuel cell-powered bus. Incidentally, the fuel cell system 10 may not necessarily be mounted in a large automobile, but may be mounted in an automobile other than the large automobile, a medium-sized automobile, a normal automobile or the like. Besides, the fuel cell-powered vehicle is equipped with a secondary battery (not shown) that stores the electric power generated by the fuel cell system 10 and that actuates the drive motor and the various auxiliaries through the use of the stored electric power, in addition to the fuel cell system 10.

The two subsystems 10A and 10B are equipped with fuel cell stacks 100A and 100B, high-pressure tanks 210A and 210B, fuel gas supply mechanisms 300A and 300B, oxidant gas supply/discharge mechanisms 400A and 400B, cooling medium circulation mechanisms 500A and 500B, and control units 600A and 600B respectively. Each of the fuel cell stacks 100A and 100B has a stack structure obtained by stacking a plurality of fuel battery unit cells (not shown) on one another, and has an anode and a cathode. In the present embodiment, the fuel battery unit cells constituting each of the fuel cell stacks 100A and 100B are solid polymer fuel cells that generate electric power through an electrochemical reaction between oxygen and hydrogen.

The high-pressure tanks 210A and 210B are tanks for hoarding fuel gas to be supplied to the fuel cell stacks 100A and 100B respectively. The high-pressure tanks 210A and 210B are provided in the subsystems 10A and 10B respectively.

The fuel gas supply mechanisms 300A and 300B are equipped with main flow passages 310A and 310B, fuel gas circulation flow passages 360A and 360B, and fuel gas discharge flow passages 390A and 390B respectively. The fuel gas supply mechanisms 300A and 300B supply fuel gas to the fuel cell stacks 100A and 100B, circulate the supplied fuel gas, and discharge the supplied fuel gas to an outside.

The main flow passages 310A and 310B are flow passages through which the fuel gas supplied to the fuel cell stacks 100A and 100B is caused to flow, and form fuel gas supply flow passages that establish communication between the fuel cell stacks 100A and 100B and the high-pressure tanks 210A and 210B respectively. Regulators 320A and 320B and injectors 340A and 340B are arranged in the main flow passages 310A and 310B respectively. The pressure applied to fuel gas and the flow rate of fuel gas are adjusted by the regulators 320A and 320B and the injectors 340A and 340B. The main flow passage 310A provided in the first subsystem 10A, and the main flow passage 310B provided in the second subsystem 10B are connected in communication with each other by a connection flow passage 312, upstream of the regulators 320A and 320B, respectively.

The fuel gas circulation flow passages 360A and 360B are flow passages for recovering an unreacted portion of the fuel gas supplied to the fuel cell stacks 100A and 100B and causing the recovered fuel gas to flow into the main flow passages 310A and 310B again, respectively. Pumps 380A and 380B for force-feeding fuel gas are arranged in the fuel gas circulation flow passages 360A and 360B respectively. Gas-liquid separators 370A and 370B for separating liquid water contained in fuel gas are arranged in the fuel gas circulation flow passages 360A and 360B respectively. The liquid water separated by the gas-liquid separators 370A and 370B is discharged, together with the fuel gas, to the outside through fuel gas discharge flow passages 390A and 390B and mufflers 470A and 470B respectively, through the opening of open/close valves 375A and 375B, respectively.

The oxidant gas supply/discharge mechanisms 400A and 400B have the function of supplying air as oxidant gas to the fuel cell stacks 100A and 100B, and discharging the oxidant gas discharged from the fuel cell stacks 100A and 100B to the outside, respectively. The oxidant gas supply/discharge mechanisms 400A and 400B are equipped with oxidant gas supply flow passages 410A and 410B, oxidant gas discharge flow passages 420A and 420B, and bypass flow passages 430A and 430B respectively. The oxidant gas supply flow passages 410A and 410B are flow passages connected to the fuel cell stacks 100A and 100B respectively, and cause the oxidant gas supplied to the fuel cell stacks 100A and 100B to flow therethrough respectively. The oxidant gas discharge flow passages 420A and 420B are flow passages connected to the fuel cell stacks 100A and 100B respectively, and discharge oxidant gas to the outside. The bypass flow passages 430A and 430B are flow passages that connect the oxidant gas supply flow passages 410A and 410B and the oxidant gas discharge flow passages 420A and 420B to each other respectively, and cause the fuel gas flowing through interiors of the oxidant gas supply flow passages 410A and 410B to flow into the oxidant gas discharge flow passages 420A and 420B without the intermediary of the fuel cell stacks 100A and 100B respectively. Air compressors 440A and 440B that force-feed oxidant gas, and three-way valves 450A and 450B that adjust the amounts of oxidant gas flowing into the bypass flow passages 430A and 430B respectively are arranged in the oxidant gas supply flow passages 410A and 410B respectively. Pressure adjusting valves 460A and 460B for adjusting the pressures of oxidant gas flowing through interiors of the fuel cell stacks 100A and 100B are arranged in the oxidant gas discharge flow passages 420A and 420B respectively. The oxidant gas discharge flow passages 420A and 420B merge with the fuel gas discharge flow passages 390A and 390B respectively. The oxidant gas flowing through interiors of the oxidant gas discharge flow passages 420A and 420B is discharged to the outside through the mufflers 470A and 470B respectively.

The cooling medium circulation mechanisms 500A and 500B cause a cooling medium (e.g., water or unfreezable water) to flow therethrough, and thereby adjust the temperatures of the fuel cell stacks 100A and 100B to appropriate temperatures respectively. The cooling medium circulation mechanisms 500A and 500B are equipped with radiators 510A and 510B that cool the cooling medium, cooling medium supply flow passages 520A and 520B, cooling medium recovery flow passages 530A and 530B, and cooling medium bypass flow passages 540A and 540B respectively. The cooling medium supply flow passages 520A and 520B are connected to the fuel cell stacks 100A and 100B respectively. The cooling medium that is supplied to the fuel cell stacks 100A and 100B flows through the cooling medium recovery flow passages 530A and 530B respectively. Cooling medium pumps 550A and 550B that deliver the cooling medium to the fuel cell stacks 100A and 100B are arranged in the cooling medium supply flow passages 520A and 520B respectively. The cooling medium recovery flow passages 530A and 530B are connected to the fuel cell stacks 100A and 100B respectively, and recover the cooling medium discharged from the fuel cell stacks 100A and 100B respectively. The cooling medium recovered by the cooling medium recovery flow passages 530A and 530B moves to the cooling medium supply flow passages 520A and 520B through the cooling medium bypass flow passages 540A and 540B or the radiators 510A and 510B respectively. Three-way valves 560A and 560B that adjust the amounts of the cooling medium flowing into the cooling medium bypass flow passages 540A and 540B are arranged at connection portions between the cooling medium recovery flow passages 530A and 530B and the cooling medium bypass flow passages 540A and 540B, respectively. Temperature sensors 570A and 570B that acquire temperatures of the cooling medium flowing out from the fuel cell stacks 100A and 100B are provided upstream of the three-way valves 560A and 560B in the cooling medium recovery flow passages 530A and 530B, respectively.

The above-mentioned gas-liquid separators 370A and 370B, the above-mentioned pumps 380A and 380B, and the above-mentioned air compressors 440A and 440B function as scavenging devices for scavenging the anodes and cathodes of the fuel cell stacks 100A and 100B respectively. The water in the fuel gas circulation flow passages 360A and 360B, and the water in the fuel cell stacks 100A and 100B are discharged, through scavenging, to the outside via the fuel gas discharge flow passages 390A and 390B and the mufflers 470A and 470B, respectively. When the fuel cell-powered vehicle is stopped, scavenging is carried out even in a state where a start switch in the fuel cell-powered vehicle is off in the present embodiment.

The two control units 600A and 600B can control the operation of the scavenging devices including the respective components of the subsystems 10A and 10B, for example, the air compressors 440A and 440B and the pumps 380A and 380B, respectively. Each of the control units 600A and 600B can perform a scavenging process for commanding each of the scavenging devices to carry out scavenging. The scavenging process is a collective term of a series of processes that are performed from a timing when the fuel cell system 10 is stopped to stop the fuel cell-powered vehicle to a timing when scavenging is carried out during stoppage of the vehicle. The scavenging process includes a decision process for deciding the control unit that performs the scavenging process, a setting process for setting a Wake Up time when the control unit is activated to carry out scavenging, and a performance process for carrying out scavenging for deciding to carry out scavenging. In the present embodiment, the control units 600A and 600B use the temperatures acquired by the temperature sensors 570A and 570B, as temperatures of the fuel cell stacks 100A and 100B respectively, in the scavenging process. The detailed contents of the scavenging process that is performed in the present embodiment will be described later. Incidentally, the electric power stored in a battery (not shown) is used as electric power for performing the various processes during stoppage of the vehicle.

The first control unit 600A and the second control unit 600B are connected to each other in a communicable manner, and perform control and the like in synchronization with each other, in a normal state of use. Besides, one of the two control units 600A and 600B, namely, the first control unit 600A in the present embodiment functions as a master control unit 610 that integrates the two control units 600A and 600B with each other. Besides, that one of the first control unit 600A and the second control unit 600B which is not the master control unit 610, namely, the second control unit 600B in the present embodiment functions as a slave control unit 620 whose operation is partially controlled by the master control unit 610. The first control unit 600A as the master control unit 610 can control the operation of the respective components of a subsystem other than the first subsystem 10A, for example, the second subsystem 10B, as well as the operation of the respective components of the first subsystem 10A equipped with the first control unit 600A itself. In concrete terms, for example, the first control unit 600A as the master control unit 610 can control the operation of the respective components of the second subsystem 10B via the second control unit 600B as the slave control unit 620.

In the present embodiment, the first subsystem 10A as the master control unit 610 issues a command to each of the components of the second subsystem 10B, via the second control unit 600B. The master control unit 610 can command the scavenging devices that are provided in all the plurality of the subsystems 10A and 10B to carry out scavenging. It can be changed which one of the first control unit 600A and the second control unit 600B functions as the master control unit 610.

The storage unit 640 has a storage medium such as a RAM, a ROM or the like. The storage unit 640 is accessible from both the control units 600A and 600B. The storage unit 640 stores various programs that are used in performing control by the control units 600A and 600B, temperatures acquired by the temperature sensors 570A and 570B, information that is output from the control units 600A and 600B, and the like.

Figure 2:
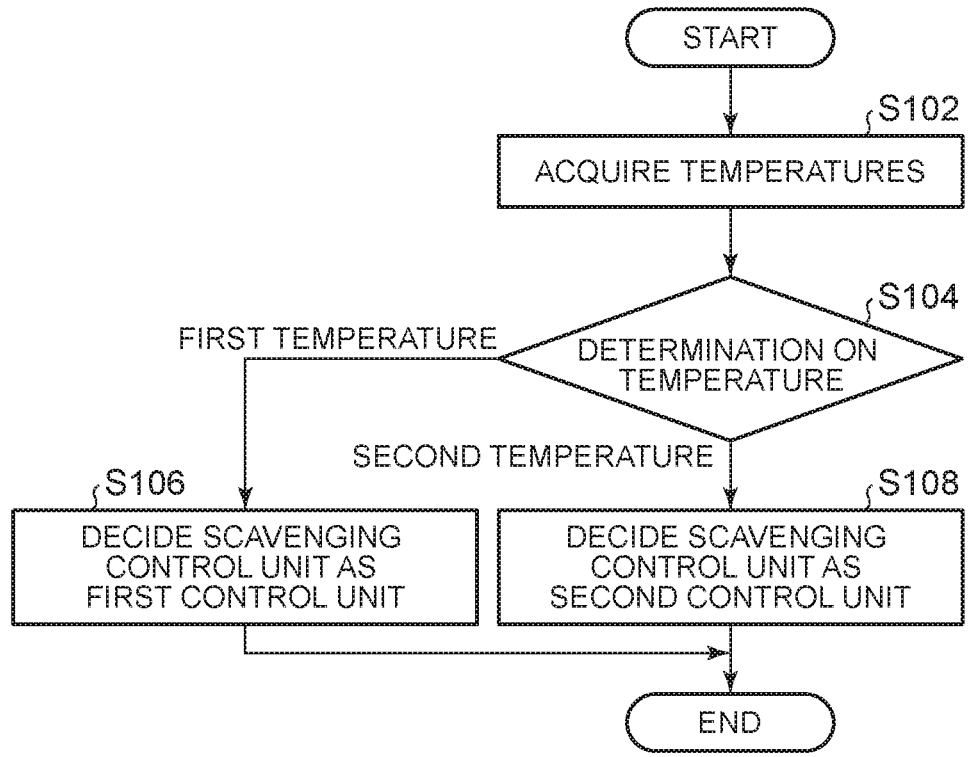
FIG. 2 is a flowchart of a decision process that is performed to decide a scavenging control unit in the first embodiment.

FIG. 2 is a flowchart of a decision process that is performed to decide the scavenging control unit in the first embodiment. The decision process is one of the processes that are performed in the scavenging process, and is a process of deciding the scavenging control unit as the control unit that issues a command to carry out scavenging. The decision process is performed by the master control unit 610 as the decision unit when stoppage of a system of the fuel cell system 10 is carried out. In the present embodiment, the time of stoppage of the system of the fuel cell system 10 concretely means a period to a timing when the master control unit 610 of the fuel cell system 10 is stopped after the start switch is switched from on to off in the fuel cell-powered vehicle that is mounted with the fuel cell system 10.

In the processing of step S102, the master control unit 610 acquires temperatures. In concrete terms, the master control unit 610 acquires a first temperature as a temperature of the fuel cell stack 100A in the first subsystem 10A, and a second temperature as a temperature of the fuel cell stack 100B in the second subsystem 10B. In the present embodiment, the first temperature is a temperature acquired by the first temperature sensor 570A. The second temperature is a temperature acquired by the second temperature sensor 570B. The first control unit 600A as the master control unit 610 acquires the first temperature by directly acquiring a signal that is output from the first temperature sensor 570A. The master control unit 610 acquires the second temperature via the second control unit 600B as the slave control unit 620. The slave control unit 620 acquires the second temperature by directly acquiring a signal that is output from the second temperature sensor 570B.

As the processing of step S104, the master control unit 610 makes a temperature determination. In the temperature determination, the master control unit 610 compares the first temperature and the second temperature with each other, and determines which one of the first temperature and the second temperature is lower than the other.

If the first temperature is lower than the second temperature as a result of step S104, the master control unit 610 performs the processing of step S106. In step S106, the master control unit 610 decides the scavenging control unit as the control unit that issues a command to carry out scavenging, as the first control unit 600A. If the first temperature is lower than the second temperature as a result of step S104, a temperature condition that the temperature of the fuel cell stack 100A of the first subsystem 10A itself is lower than the temperature of the other fuel cell stack 100B is fulfilled in the first subsystem 10A. Incidentally, in the present embodiment, if the first temperature and the second temperature are equal to each other, it is determined that the first temperature is the lower temperature.

If the second temperature is lower than the first temperature as a result of step S104, the master control unit 610 performs the processing of step S108. In step S108, the master control unit 610 decides the scavenging control unit as the second control unit 600B. If the second temperature is lower than the first temperature as a result of step S104, a temperature condition that the temperature of the fuel cell stack 100B of the second subsystem 10B itself is lower than the temperature of the other fuel cell stack 100A is fulfilled, in the second subsystem 10B.

The decision in step S106 or step S108 is stored into the storage unit 640 in such a state as to be readable from both the master control unit 610 and the slave control unit 620. After step S106 or step S108 is carried out, the master control unit 610 ends the decision process. In accordance with the decision stored in the storage unit 640, the control unit 600A or 600B decided as the scavenging control unit performs a process including a determination on the presence/absence of the carrying out of scavenging and the issuance of a command to carry out scavenging (a performance process that will be described later), as the scavenging control unit.

Figure 3:
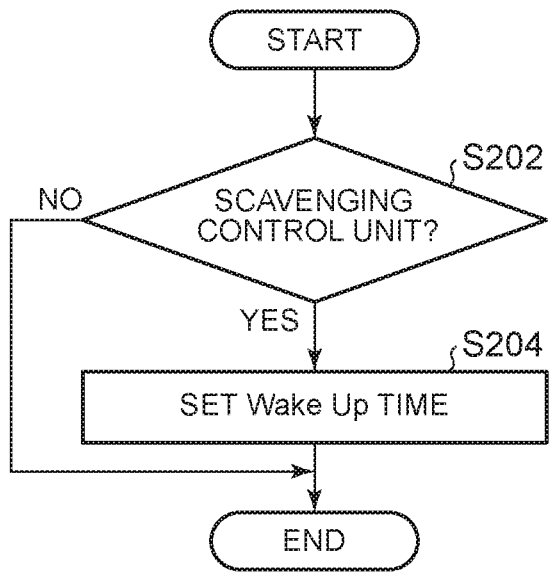
FIG. 3 is a flowchart of a process of setting a Wake Up time.

FIG. 3 is a flowchart of a process of setting the Wake Up time. The process of setting the Wake Up time is one of the processes that are performed in the scavenging process, and is performed in both the first control unit 600A and the second control unit 600B, regardless of whether or not each of the first control unit 600A and the second control unit 600B is the master control unit 610. The process of setting the Wake Up time is performed after the decision process when the system of the fuel cell system 10 is stopped. The first control unit 600A and the second control unit 600B will be referred to hereinafter simply as the control unit 600 when the first control unit 600A and the second control unit 600B are not distinguished from each other.

As the processing of step S202, the control unit 600 determines whether or not the control unit 600 itself is the scavenging control unit decided in the decision process. This determination is made by reading the decision stored in the storage unit 640.

If the result of step S202 is "Yes", namely, if the control unit 600 itself is the scavenging control unit, the Wake Up time is set as the processing of step S204. The Wake Up time is a timing when the scavenging control unit itself that has set the Wake Up time is activated with the fuel cell system 10 stopped, namely, with the start switch off. After the processing of step S204, the control unit 600 ends the setting process. The set Wake Up time is reset when the fuel cell system 10 is activated, namely, when the start switch is switched from off to on before the Wake Up time.

If the result of step S202 is "No", namely, if the control unit 600 itself is not the scavenging control unit, the control unit 600 ends the setting process without performing the processing of step S204. After the end of the setting process, the control unit 600 is changed from its activated state to its stopped state.

Figure 4:
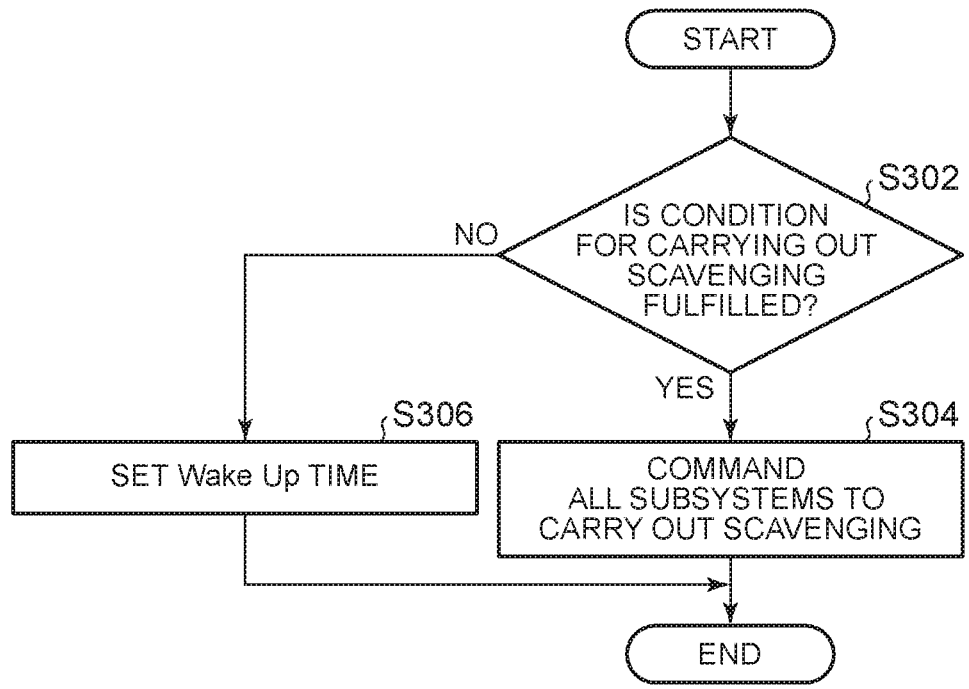
FIG. 4 is a flowchart of a performance process that is performed to carry out scavenging in the first embodiment.

FIG. 4 is a flowchart of a performance process that is performed to carry out scavenging in the first embodiment. This performance process is performed by the scavenging control unit activated in accordance with the set Wake Up time. The respective components of the subsystem equipped with the scavenging control unit, for example, the first subsystem 10A are made operable through the activation of the scavenging control unit. On the other hand, the respective components of the subsystem unequipped with the scavenging control unit, for example, the second subsystem 10B are inoperable, namely, stopped, because the control unit 600B is stopped.

As the processing of step S302, the scavenging control unit makes a scavenging determination, namely, a determination as to whether or not a condition for carrying out scavenging is fulfilled. The condition for carrying out scavenging is that there is a risk of produced water freezing in the fuel cell system 10. The condition for carrying out scavenging is that the temperature of the fuel cell stack equipped with the scavenging control unit, for example, the first fuel cell stack 100A is equal to or lower than a threshold. The threshold is set in accordance with a temperature at which produced water can freeze, and is a temperature determined in advance as equal to or higher than, for example, 0° C. Owing to the processing of step S302, the scavenging control unit can determine whether or not the condition for carrying out scavenging is fulfilled, through the use of the temperature acquired in the subsystem 10A having that one of the fuel cell stacks 100A and 100B whose temperature is lower than that of the other when the fuel cell system 10 is stopped. When the system is stopped, freeze is likely to occur earlier in that one of the subsystems 10A and 10B which has the fuel cell stack 100A or 100B whose temperature is lower than that of the other than in the other subsystem. Therefore, the possibility of the scavenging process not being performed at an appropriate timing, for example, the possibility of the scavenging process being performed later than a timing when freeze occurs in one of the first subsystem 10A and the second subsystem 10B is reduced.

If the result of step S302 is "Yes", namely, if the condition for carrying out scavenging is fulfilled, the scavenging control unit issues a command to carry out scavenging, as the processing of step S304. In the processing of step S304, the scavenging control unit commands the scavenging devices of all the subsystems including the subsystem provided with the scavenging control unit itself, namely, both the first subsystem 10A and the second subsystem 10B to carry out scavenging. In concrete terms, the scavenging control unit directly issues a command to the scavenging device of the subsystem equipped with the scavenging control unit itself. Besides, the scavenging control unit issues a command to the scavenging device of the subsystem unequipped with the scavenging control unit itself, via the control unit other than the scavenging control unit, for example, the second control unit 600B. In this case, the scavenging control unit issues a command of scavenging after issuing a command of activation to the control unit other than the scavenging control unit.

As a result of the performance of the processing of step S304, the scavenging process is simultaneously performed in the plurality of the subsystems 10A and 10B in the fuel cell system 10. After the processing of step S304, the scavenging control unit ends the performance process for carrying out scavenging. After the end of the performance process for carrying out scavenging, all the control units 600A and 600B including the scavenging control unit shift from their activated state to their stopped state.

If the result of step S302 is "No", namely, if the condition for carrying out scavenging is not fulfilled, the scavenging control unit sets the Wake Up time as the processing of step S306. After the processing of step S306, the scavenging control unit temporarily ends the performance process for carrying out scavenging. After the end of the performance process for carrying out scavenging, the scavenging control unit shifts from its activated state to its stopped state. When the processing of step S306 is performed, the control unit other than the scavenging control unit is held in its stopped state instead of shifting to its activated state, in the performance process for carrying out scavenging. When step S306 is carried out, the Wake Up time is set again. Therefore, as soon as the Wake Up time set again comes, the performance process for carrying out scavenging is performed.

According to the first embodiment described above, with the fuel cell system 10, the control unit 600A of that one of the plurality of the subsystems 10A and 10B whose temperature of the fuel cell stack is specified as being the lowest, for example, the first subsystem 10A functions as the scavenging control unit. The first control unit 600A as the scavenging control unit performs scavenging control including a determination on the carrying out of scavenging in the first subsystem 10A (step S302 of FIG. 4) and the issuance of a command to carry out scavenging to all the subsystems 10A and 10B in accordance with the determination (step S304 of FIG. 4). Accordingly, this fuel cell system 10 can reduce the possibility of the scavenging process not being performed at an appropriate timing, even in the case where the timing when residual water, for example, produced water in the fuel cell stacks 100A and 100B freezes differs between the subsystems due to the difference between environments in which the subsystems 10A and 10B are used respectively. Incidentally, the timings when the produced water in the fuel cell stacks 100A and 100B freezes may be different from each other between the subsystems 10A and 10B, when the environments in which the respective subsystems 10A and 10B are used are different from each other. The environments in which the respective subsystems 10A and 10B are used are different from each other when the frequencies with which the subsystems 10A and 10B are exposed to the wind and sunlight are different from each other possibly due to the difference between positions of the subsystems 10A and 10B in a garage in which the fuel cell-powered vehicle is stopped.

Besides, according to the first embodiment described above, the master control unit 610 can determine which one of the control units 600A and 600B fulfills the condition as the scavenging control unit, every time the fuel cell system 10 is stopped from operating. Therefore, the fuel cell system 10 can reduce the possibility of the scavenging process not being performed at an appropriate timing, even in the case where the environments in which the respective subsystems 10A and 10B are used may be different from each other every time the fuel cell system 10 is stopped.

Besides, according to the first embodiment described above, the fuel cell system 10 makes a determination on the presence/absence of the carrying out of scavenging, with only one of the plurality of the control units 600A and 600B activated. In consequence, according to this fuel cell system 10, the amount of energy consumption is made smaller than in the case where all the control units 600A and 600B are activated in making the determination on the presence/absence of the carrying out of scavenging.

B. Second Embodiment

The fuel cell system 10 according to the second embodiment is different from the fuel cell system 10 according to the first embodiment in performing a specification process. The specification process is a process of specifying that one of the two subsystems 10A and 10B which fulfills a temperature condition. Besides, the fuel cell system 10 according to the second embodiment is different from the fuel cell system 10 according to the first embodiment in refraining from performing the decision process after the completion of specification by the specification process. Incidentally, components and processes similar to those of the first embodiment will be hereinafter denoted by the same reference symbols respectively, and the detailed description thereof will be omitted.

Figure 5:
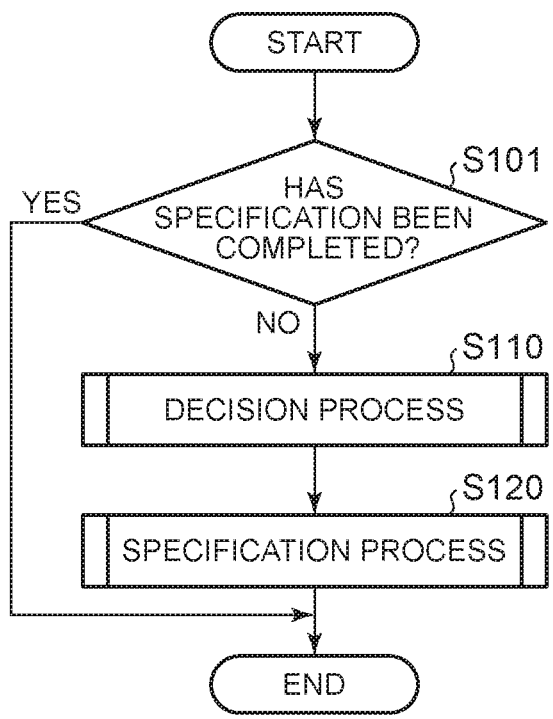
FIG. 5 is a flowchart showing the contents of a decision/specification process including a decision process and a specification process that are performed in the second embodiment.

FIG. 5 is a flowchart showing the contents of a decision/specification process including a decision process and a specification process that are performed in the second embodiment. The master control unit 610 as the decision unit carries out step S120 as the specification process, after carrying out step S110 as the decision process.

Upon the start of the decision/specification process, the master control unit 610 first determines whether or not specification has been completed, as the processing of step S101. In concrete terms, the master control unit 610 determines whether or not a result of specification that will be described later is stored in the storage unit 640. If the result of the processing of step S101 is "Yes", namely, if the specified result is stored in the storage unit 640, the master control unit 610 ends the decision/specification process without performing the decision process (step S110) and the specification process (step S120). If the result of the processing of step S101 is "No", namely, if the specified result is not stored in the storage unit 640, the master control unit 610 performs the decision process (step S110).

Figure 6:
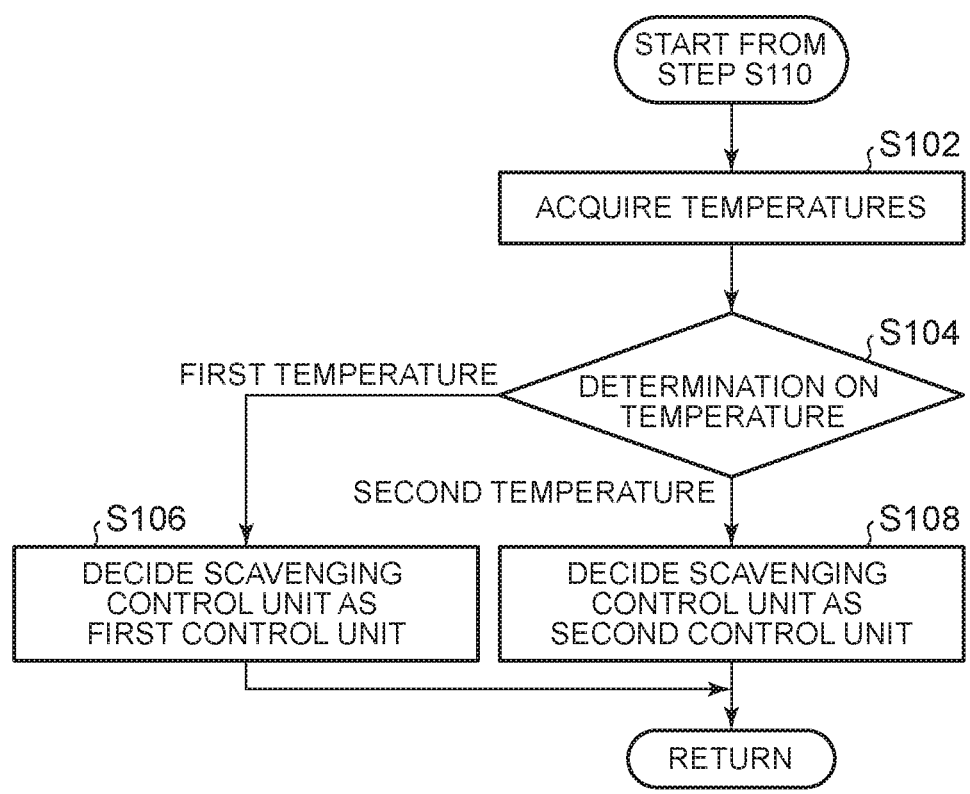
FIG. 6 is a flowchart showing the contents of the decision process.

FIG. 6 is a flowchart showing the contents of the decision process. As the processing of step S102, the master control unit 610 acquires a first temperature and a second temperature. As the processing of step S104, the master control unit 610 makes a temperature determination. In the temperature determination, the master control unit 610 compares the first temperature and the second temperature with each other, and determines which one of the first temperature and the second temperature is lower than the other. If the first temperature is lower than the second temperature as a result of step S104, the master control unit 610 decides the control unit that issues a command to carry out scavenging, as the first control unit 600A, as the processing of step S106. If the second temperature is lower than the first temperature as a result of step S104, the master control unit 610 decides the scavenging control unit, which is the control unit that issues a command to carry out scavenging, as the second control unit 600B, as the processing of step S108. The decision in step S106 or step S108 is stored into the storage unit 640 in such a manner as to be readable from both the master control unit 610 and the slave control unit 620. After step S106 or step S108 is carried out, the master control unit 610 ends the decision process, and performs the processing of step S120 shown in FIG. 5.

FIG. 7 is a flowchart showing the contents of the specification process as step S120. When the processing of step S120 shown in FIG. 5 is started, the processing from step S122 to step S126 shown in FIG. 7 is performed.

As the processing of step S122, the master control unit 610 makes a determination on the result of the decision process. In concrete terms, the master control unit 610 determines which one of the control units 600A and 600B has been decided as the scavenging control unit as a result of the decision process.

In the processing of step S1242 and step S1244, the master control unit 610 measures the number of times of successive decision of the scavenging control unit as the first control unit 600A and the number of times of successive decision of the scavenging control unit as the second control unit 600B. If the scavenging control unit is decided as the first control unit 600A as a result of the processing of step S122, the master control unit 610 measures the number of times of successive decision of the scavenging control unit as the first control unit 600A, as the processing of step S1242. In this case, the measured result of the number of times of successive decision of the scavenging control unit as the second control unit 600B is reset. If the scavenging control unit is decided as the second control unit 600B as a result of the processing of step S122, the master control unit 610 measures the number of times of successive decision of the scavenging control unit as the second control unit 600B, as the processing of step S1244. In this case, the measured result of the number of times of successive decision of the scavenging control unit as the first control unit 600A is reset.

As the processing of step S126, the master control unit 610 determines whether or not a specification condition is fulfilled. The specification condition is successive decision through the decision process, and is that the number of times measured in the processing of step S1242 and step S1244 is equal to or larger than a predetermined number of times in the present embodiment. The predetermined number of times is set as the number of times of succession that can be regarded as enabling specification.

If the result of the processing of step S126 is "No", namely, if the specification condition is not fulfilled, the master control unit 610 ends the specification process without carrying out specification of the scavenging control unit.

If the result of the processing of step S126 is "Yes", namely, if the specification condition is fulfilled, the master control unit 610 carries out specification of the scavenging control unit, as the processing of step S128. In concrete terms, the master control unit 610 stores a result of specification of the control unit 600 on which the specification condition is fulfilled, for example, information indicating which one of the control units 600A and 600B is the scavenging control unit into the storage unit 640, and stores the completion of specification into the storage unit 640. Upon the completion of the processing of step S126, the master control unit 610 ends step S130 shown in FIG. 7. Upon the end of step S130, the master control unit 610 ends the decision/specification process shown in FIG. 5.

In the case where specification as the processing of step S128 has been completed, the result of the processing of step S101 of FIG. 5 is "Yes" when the vehicle is stopped next time and thereafter. Thus, when the vehicle is stopped next time and thereafter, the processing of step S110 and the processing of step S120 are not performed. Therefore, the control unit 600 decided as the scavenging control unit in carrying out specification functions as the scavenging control unit also when the vehicle is stopped next time and thereafter.

The fuel cell system 10 according to the present embodiment performs the setting process shown in FIG. 3 and the scavenging process shown in FIG. 4, in accordance with the result of the decision/specification process shown in FIG. 5.

According to the second embodiment described above, the fuel cell system 10 exerts an effect similar to that of the first embodiment, insofar as it has a configuration similar to that of the first embodiment. The master control unit 610 as the decision unit refrains from performing the decision process including a determination as to which one of the control units 600A and 600B fulfills the condition as the scavenging control unit, when the specification condition is fulfilled. Accordingly, in this fuel cell system 10, the load applied to the master control unit 610 by making the determination every time the vehicle is stopped, and the amount of energy consumption are reduced.

Besides, according to the second embodiment described above, after the completion of specification, each of the control units 600A and 600B as the scavenging control unit can make a determination on scavenging through the use of the temperature of each of the fuel cell stacks 100A and 100B in each of the subsystems 10A and 10B equipped with each of the control units 600A and 600B itself. Besides, after the completion of specification, the scavenging control unit can command all the scavenging devices provided in the plurality of the subsystems 10A and 10B respectively to carry out scavenging. It should be noted herein that that one of the subsystems 10A and 10B which is equipped with the scavenging control unit after the completion of specification is specified as being lower in temperature than the fuel cell stack 100A or 100B of any one of the plurality of the subsystems 10A and 10B. Therefore, this fuel cell system 10 can reduce the possibility of scavenging not being carried out at an appropriate timing, even after the completion of specification.

C. Third Embodiment

The fuel cell system 10 according to the third embodiment is different from the fuel cell system 10 according to the aforementioned second embodiment in refraining from performing the decision process. Besides, by refraining from performing the decision process, the processing contents are made different in the decision/specification process, the setting process, and the scavenging process as well. Incidentally, in the present embodiment, when the specification process has not been completed, information indicating which one of the first control unit 600A and the second control unit 600B is the scavenging control unit is not stored in the storage unit 640.

FIG. 8 is a flowchart showing the contents of the decision/specification process in the third embodiment. In the third embodiment, when the decision/specification process is started, the master control unit 610 as the specification unit determines whether or not a result of specification is stored in the storage unit 640, as the processing of step S101. If the result of the processing of step S101 is "Yes", namely, if the specified result is stored in the storage unit 640, the master control unit 610 ends the decision/specification process without performing the specification process (step S130). If the result of the processing of step S101 is "No", namely, if the specified result is not stored in the storage unit 640, the master control unit 610 performs the specification process (step S130).

FIG. 9 is a flowchart showing the contents of the specification process (step S130) that is performed in the third embodiment. When the processing of step S130 shown in FIG. 8 is started, the processing from step S132 to step S138 shown in FIG. 7 is performed.

As the processing of step S132, the master control unit 610 acquires a first temperature and a second temperature. As the processing of step S133, the master control unit 610 makes a temperature determination. In the temperature determination, the master control unit 610 compares the first temperature and the second temperature with each other, and determines which one of the first temperature and the second temperature is lower than the other.

As the processing of step S134, the master control unit 610 acquires the first temperature and the second temperature. As the processing of step S134, the master control unit 610 makes the temperature determination. In the temperature determination, the master control unit 610 compares the first temperature and the second temperature with each other, and determines which one of the first temperature and the second temperature is lower than the other.

In the processing of step S1342 and step S1344, the master control unit 610 measures the number of times of successive determination as to which one of the first temperature and the second temperature is lower than the other. If it is determined as a result of the processing of step S133 that the first temperature is lower than the second temperature, the master control unit 610 measures the number of times of successive determination that the first temperature is lower than the second temperature, as the processing of step S1342. If it is determined as a result of the processing of step S132 that the second temperature is lower than the first temperature, the master control unit 610 measures the number of times of successive determination that the second temperature is lower than the first temperature, as the processing of step S1344.

As the processing of step S136, the master control unit 610 determines whether or not the specification condition is fulfilled. The specification condition is that that one of the two subsystems 10A and 10B which fulfills the temperature condition can be specified. The specification condition is that the number of times measured in the processing of step S1342 and step S1344 is equal to or larger than the predetermined number of times, in the present embodiment. The predetermined number of times is set as the number of times of succession that can be regarded as enabling specification.

If the result of the processing of step S136 is "No", namely, if the specification condition is not fulfilled, the master control unit 610 ends the specification process without carrying out specification of the scavenging control unit.

If the result of the processing of step S136 is "Yes", namely, if the specification condition is fulfilled, the master control unit 610 carries out specification of the scavenging control unit, as the processing of step S138. In concrete terms, the master control unit 610 stores the result of specification of the control unit 600 on which the specification condition is fulfilled, into the storage unit 640, and stores the completion of specification into the storage unit 640. Upon the completion of the processing of step S138, the master control unit 610 ends step S130 shown in FIG. 8. Upon the end of step S130, the master control unit 610 ends the decision/specification process shown in FIG. 8.

In the case where specification as the processing of step S138 has been completed, the result of the processing of step S101 of FIG. 8 is "Yes" when the vehicle is stopped next time and thereafter. Thus, the processing of step S130 is not performed when the vehicle is stopped next time and thereafter.

Figure 10:
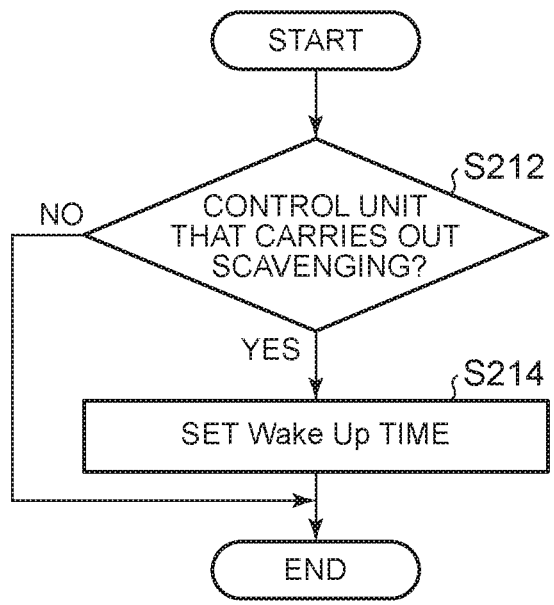
FIG. 10 is a flowchart of a process that is performed to set a Wake Up time in the third embodiment.

FIG. 10 is a flowchart of a process that is performed to set the Wake Up time in the third embodiment. As is the case with the setting processes in the first embodiment and the second embodiment, the process of setting the Wake Up time is performed after the decision process, when the system of the fuel cell system 10 is stopped.

As the processing of step S212, the control unit 600 determines whether or not the control unit 600 itself is the control unit that makes a determination on scavenging. This determination is made by reading the information stored in the storage unit 640. In the present embodiment, when specification has been completed, one of the first control unit 600A and the second control unit 600B is stored as the scavenging control unit. On the other hand, as described above, when the specification process has not been completed, the information indicating the scavenging control unit is not stored. In the present embodiment, when the information indicating the scavenging control unit is not stored, each of the plurality of the control units 600A and 600B makes the determination on scavenging.

If the result of step S212 is "Yes", namely, if specification has not been completed, or if specification has been completed and the control unit 600 itself is the scavenging control unit, the Wake Up time is set as the processing of step S214. After the processing of step S214, the control unit 600 ends the setting process. The set Wake Up time is reset when the fuel cell system 10 is activated, namely, when the start switch is switched from off to on before the Wake Up time.

If the result of step S212 is "No", namely, if specification has been completed and the control unit 600 itself is not the scavenging control unit, the control unit 600 ends the setting process without performing the processing of step S214.

Figure 11:
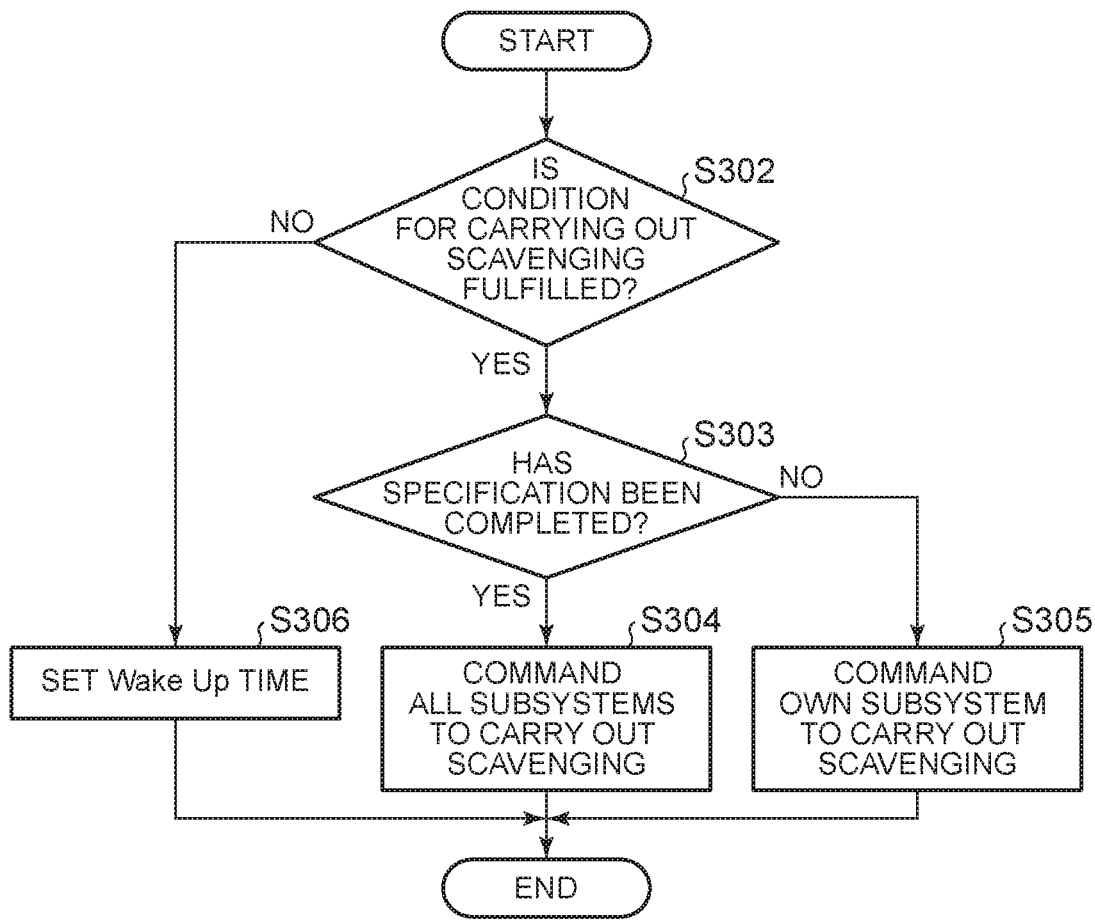
FIG. 11 is a flowchart of a performance process that is performed to carry out scavenging in the third embodiment.

FIG. 11 is a flowchart of a performance process that is performed to carry out scavenging in the third embodiment. This performance process is performed by the control unit 600 that has been activated in accordance with the set Wake Up time. When the performance process for carrying out scavenging is started, the control unit 600 makes the determination on scavenging, as the processing of step S302. In the determination on scavenging, it is determined whether or not the condition for carrying out scavenging is fulfilled.

If the result of step S302 is "Yes", namely, if the condition for carrying out scavenging has been fulfilled, the control unit 600 determines whether or not specification has been completed, as the processing of step S303. The determination in the processing of step S303 is made depending on whether or not the result of specification is stored in the storage unit 640.

If the result of the processing of step S303 is "Yes", namely, if specification has been completed, the control unit 600 performs the processing of step S304 as the scavenging control unit. The scavenging control unit commands the scavenging devices of all the subsystems including the subsystem equipped with the scavenging control unit itself to carry out scavenging, as the processing of step S304. After step S304, the scavenging control unit ends the performance process for carrying out scavenging. After the end of the performance process for carrying out scavenging, all the control units 600A and 600B including the scavenging control unit shift from their activated state to their stopped state.

If the result of the processing of step S303 is "No", namely, if specification has not been completed, the control unit 600 performs the processing of step S305. The control unit 600 commands only the scavenging device of the subsystem equipped with the control unit 600 itself to carry out scavenging, as the processing of step S305. After step S305, the control unit 600 ends the performance process for carrying out scavenging. After the end of the performance process for carrying out scavenging, the control unit 600 shifts from its activated state to its stopped state.

If the result of step S302 is "No", namely, if the condition for carrying out scavenging is not fulfilled, the control unit 600 performs the processing of step S306. The control unit 600 sets the Wake Up time, as the processing of step S306. After the processing of step S306, the control unit 600 temporarily ends the performance process for carrying out scavenging. After the end of the performance process for carrying out scavenging, the control unit 600 shifts from its activated state to its stopped state. When step S306 is carried out, the Wake Up time is set again. Therefore, as soon as the Wake Up time set again comes, the performance process for carrying out scavenging is performed.

According to the fuel cell system 10 of the third embodiment described above, the control unit of the subsystem whose temperature of the fuel cell stack is specified as being the lowest among the plurality of the subsystems 10A and 10B performs scavenging control including a determination on the carrying out of scavenging in the subsystem, and the issuance of a command to carry out scavenging to all the subsystems in accordance with the determination. Accordingly, this fuel cell system 10 can reduce the possibility of the scavenging process not being performed at an appropriate timing, even in the case where the timings when residual water, for example, produced water in the fuel cell stacks 100A and 100B freezes are different from each other between the subsystems 10A and 10B due to the difference between the environments in which the respective subsystems 10A and 10B are used.

Besides, according to the third embodiment described above, after the completion of specification, the fuel cell system 10 makes a determination on the presence/absence of the carrying out of scavenging, with only one of the plurality of the control units 600A and 600B activated. Accordingly, in this fuel cell system 10, the amount of energy consumption can be made smaller than in the case where all the control units 600A and 600B are activated in making the determination on the presence/absence of the carrying out of scavenging.

Besides, according to the third embodiment described above, the fuel cell system 10 performs the performance process with the plurality of the control units 600A and 600B activated respectively, before the completion of specification. Besides, before the completion of specification, each of the plurality of the control units 600A and 600B commands only each of the subsystems 10A and 10B equipped with each of the control units 600A and 600B itself to carry out scavenging. Thus, before the completion of specification, the fuel cell system 10 can adjust the timing of scavenging for each of the subsystems 10A and 10B. Accordingly, this fuel cell system 10 can reduce the possibility of scavenging not being carried out at an appropriate timing, even before the completion of specification.

D. Fourth Embodiment

The fuel cell system 10 according to the fourth embodiment is different from the fuel cell system 10 according to the third embodiment in carrying out specification through the use of additional information as well as a result of enumeration indicating trends of the first temperature and the second temperature, in the specification process.

Figure 12:
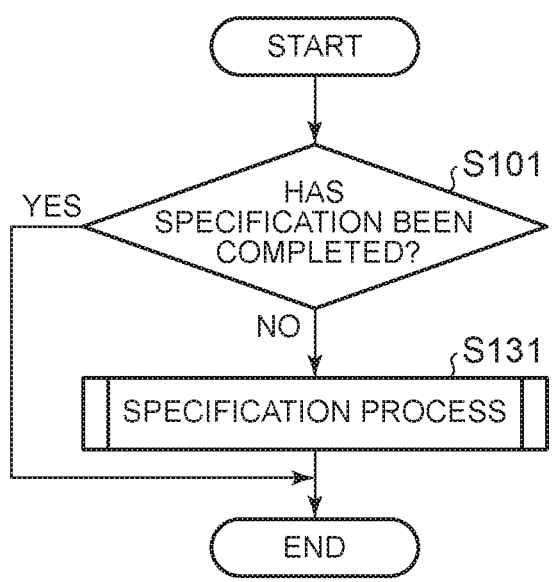
FIG. 12 is a flowchart showing the contents of a decision/specification process in the fourth embodiment.

FIG. 12 is a flowchart showing the contents of a decision/specification process in the fourth embodiment. When the decision/specification process is started in the fourth embodiment, the master control unit 610 as the specification unit determines whether or not the result of specification is stored in the storage unit 640, as the processing of step S101. If the result of the processing of step S101 is "Yes", namely, if the specified result is stored in the storage unit 640, the master control unit 610 ends the decision/specification process without performing the specification process (step S131). If the result of the processing of step S101 is "No", namely, if the specified result is not stored in the storage unit 640, the master control unit 610 performs the specification process (step S131).

Figure 13:
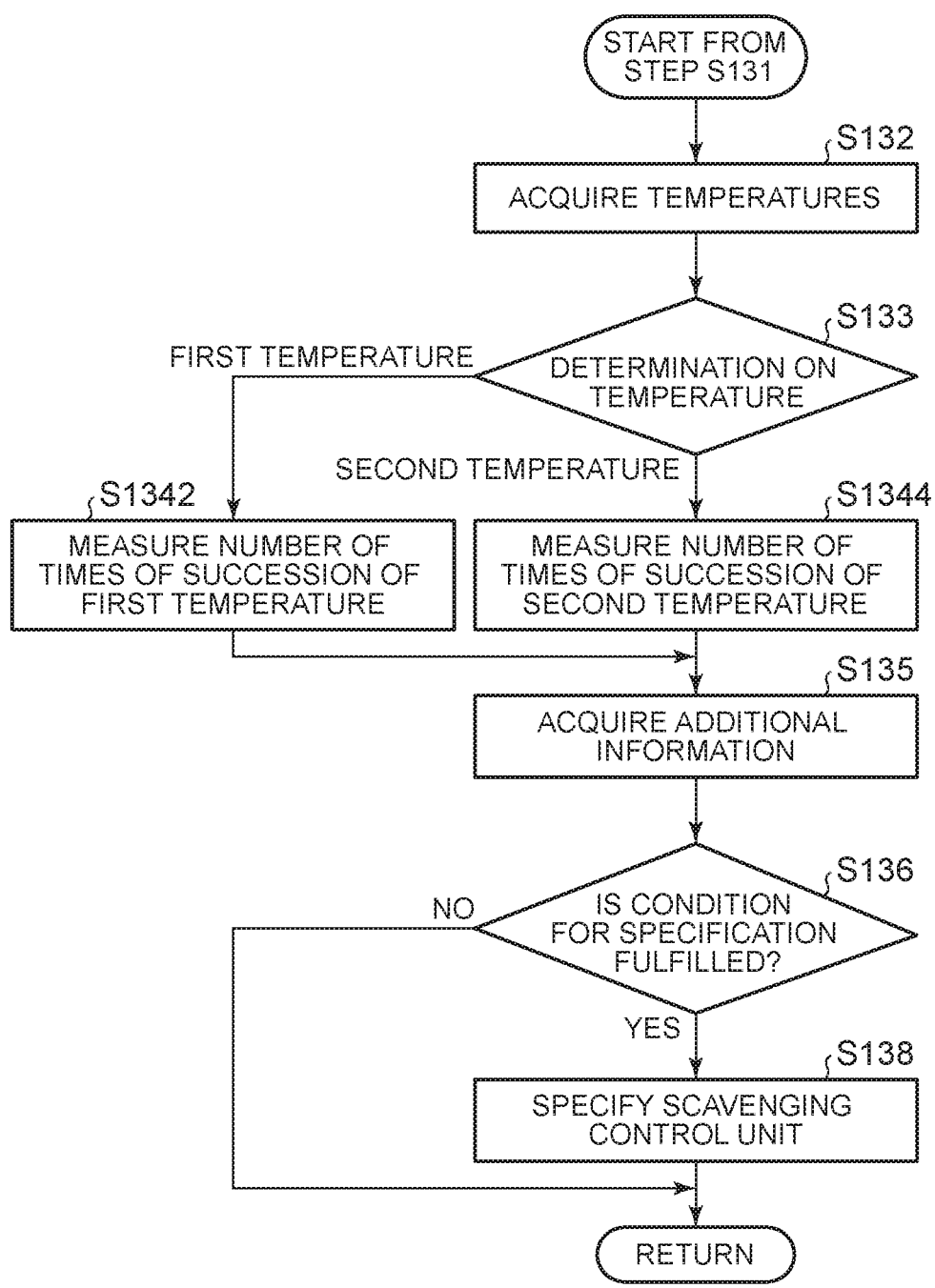
FIG. 13 is a flowchart showing the contents of a specification process (step S131) that is performed in the fourth embodiment.

FIG. 13 is a flowchart showing the contents of the specification process (step S131) that is performed in the fourth embodiment. When the processing of step S131 shown in FIG. 12 is started, the processing from step S132 to step S138 shown in FIG. 13 is performed.

As the processing of step S132, the master control unit 610 acquires a first temperature and a second temperature. As the processing of step S133, the master control unit 610 makes a temperature determination. In the temperature determination, the master control unit 610 compares the first temperature and the second temperature with each other, and determines which one of the first temperature and the second temperature is lower than the other.

In the processing of step S1342 and step S1344, the master control unit 610 measures the number of times of successive determination that one of the first temperature and the second temperature is lower than the other. If it is determined as a result of the processing of step S133 that the first temperature is lower than the second temperature, the master control unit 610 measures the number of times of successive determination that the first temperature is lower than the second temperature, as the processing of step S1342. If it is determined as a result of the processing of step S132 that the second temperature is lower than the first temperature, the master control unit 610 measures the number of times of successive determination that the second temperature is lower than the first temperature, as the processing of step S1344.

In the processing of step S135, the master control unit 610 acquires additional information. The additional information is acquired by reading the additional information stored in the storage unit 640 in the scavenging process (FIG. 14) that will be described later. In the present embodiment, the additional information is information on the carrying out of scavenging as to each of the two control units 600A and 600B. The additional information is information indicating a difference resulting from the performance of the performance process for carrying out scavenging by each of the two control units 600A and 600B in the carrying out of scavenging as to each of the two control units 600A and 600B, before specification is carried out. In concrete terms, the additional information is the timing when scavenging is carried out and the number of times of the carrying out of scavenging, in the present embodiment. Incidentally, the additional information may include various pieces of information, for example, an outside air temperature at the time when scavenging is carried out, in addition to or instead of the timing when scavenging is carried out and the number of times of the carrying out of scavenging.

As the processing of step S136, the master control unit 610 determines whether or not a specification condition is fulfilled. The specification condition is obtained by adding two conditions to the condition, namely, whether or not the number of times measured in the processing of step S1342 and step S1344 is equal to or larger than the predetermined number of times. The additional condition is used in the specification condition. In concrete terms, the specification condition is obtained by adding the two conditions, namely, whether or not the number of times of successive performance of the scavenging process is equal to or larger than the prescribed number of times, and whether or not the number of times of successively carrying out scavenging early is equal to or larger than the prescribed number of times. After this, the fuel cell system 10 performs the process of setting the Wake Up time shown in FIG. 10, as is the case with the third embodiment.

If the result of the processing of step S136 is "No", namely, if the specification condition is not fulfilled, the master control unit 610 ends the specification process without carrying out specification of the scavenging control unit.

If the result of the processing of step S136 is "Yes", namely, if the specification condition is fulfilled, the master control unit 610 carries out specification of the scavenging control unit, as the processing of step S138. Upon the completion of the processing of step S138, the master control unit 610 ends step S131 shown in FIG. 12. Upon the end of step S131, the master control unit 610 ends the decision/specification process shown in FIG. 12. After ending the decision/specification process, the fuel cell system 10 according to the fourth embodiment performs the process of setting the Wake Up time shown in FIG. 10.

Figure 14:
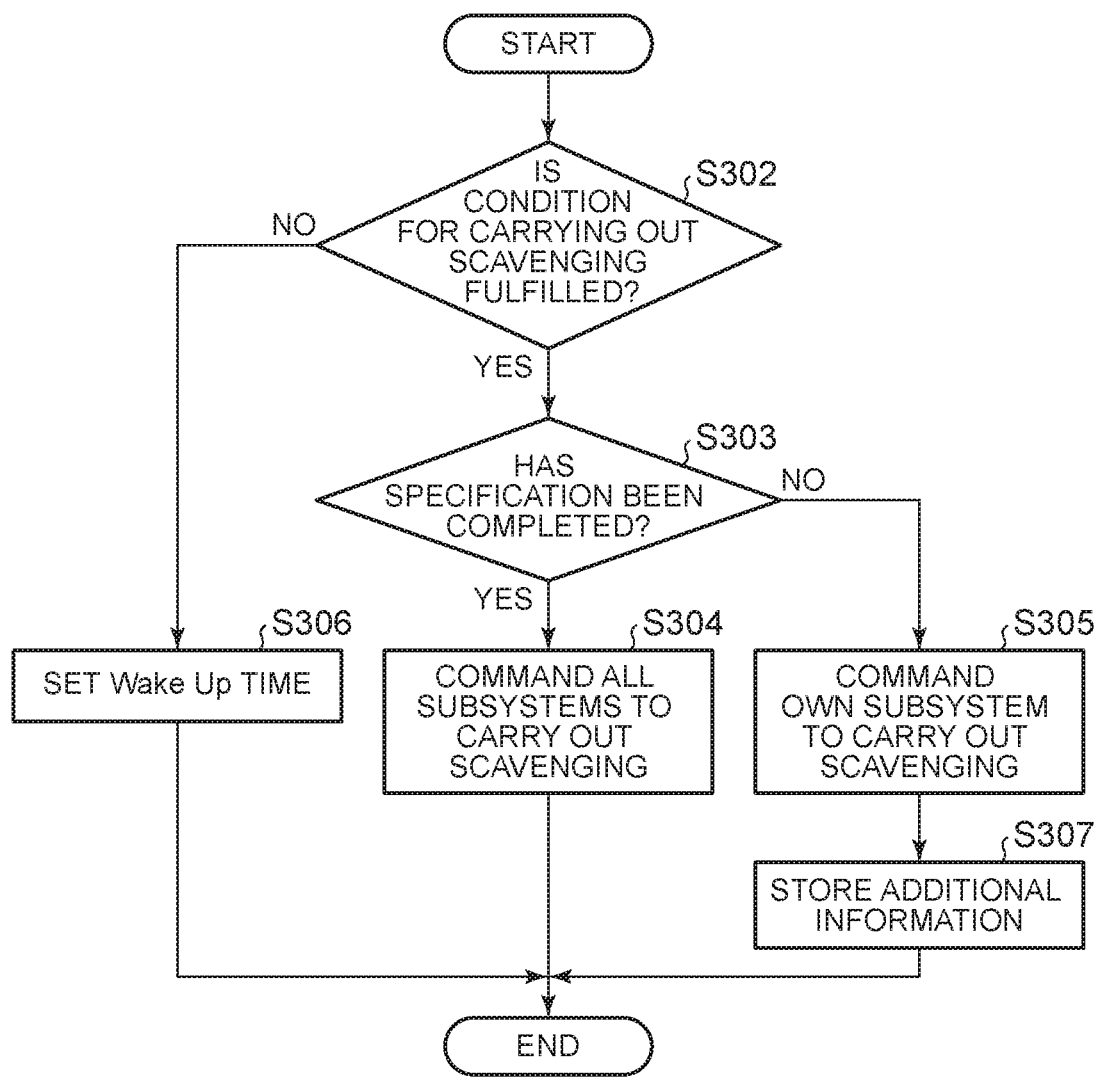
FIG. 14 is a flowchart of a process that is performed to carry out scavenging in the fourth embodiment.

FIG. 14 is a flowchart of a performance process that is performed to carry out scavenging in the fourth embodiment. This performance process is performed by the control unit 600 activated in accordance with the set Wake Up time.

As the processing of step S302, the control unit 600 determines whether or not a condition for carrying out scavenging is fulfilled. The condition for carrying out scavenging is a condition that produced water is predicted to freeze in the fuel cell system 10 in making the determination. The condition for carrying out scavenging is that the temperature of the fuel cell stack equipped with the scavenging control unit, for example, the first fuel cell stack 100A is equal to or lower than a predetermined threshold equal to or higher than 0° C.

If the result of step S302 is "Yes", namely, if the condition for carrying out scavenging is fulfilled, the control unit 600 determines whether or not specification has been completed, as the processing of step S303. The determination in the processing of step S303 is made depending on whether or not the result of specification is stored in the storage unit 640.

If the result of the processing of step S303 is "Yes", namely, if specification has been completed, the control unit 600 performs the processing of step S304, namely, commands the scavenging devices of all the subsystems including the subsystem equipped with the control unit 600 itself to carry out scavenging, as the scavenging control unit. After step S304, the scavenging control unit ends the performance process for carrying out scavenging. After the end of the performance process for carrying out scavenging, all the control units 600A and 600B including the scavenging control unit shift from their activated state to their stopped state.

If the result of the processing of step S303 is "No", namely, if specification has not been completed, the control unit 600 commands only the scavenging device of the subsystem equipped with the control unit 600 itself to carry out scavenging, as the processing of step S305.

After the processing of step S305, the control unit 600 stores additional information, as the processing of step S307. In concrete terms, the control unit 600 stores the timing when the scavenging process is performed and the measured number of times of the carrying out of the scavenging process, as the additional information. After step S307, the control unit 600 ends the performance process for carrying out scavenging. After the end of the performance process for carrying out scavenging, the control unit 600 shifts from its activated state to its stopped state.

If the result of step S302 is "No", namely, if the condition for carrying out scavenging is not fulfilled, the control unit 600 sets the Wake Up time, as the processing of step S306. After the processing of step S306, the control unit 600 temporarily ends the performance process for carrying out scavenging. After the end of the performance process for carrying out scavenging, the control unit 600 shifts from its activated state to its stopped state. When step S306 is carried out, the Wake Up time is set again. Therefore, as soon as the Wake Up time set again comes, the performance process for carrying out scavenging is performed.

According to the fourth embodiment described above, the fuel cell system 10 exerts an effect similar to that of the third embodiment, insofar as it has a configuration similar to that of the third embodiment. Furthermore, according to the fourth embodiment, in the specification process, specification is carried out through the use of the additional information as well as the result of enumeration indicating the trends of the first temperature and the second temperature. Accordingly, the fuel cell system 10 can enhance the accuracy in determining whether or not the specification condition is fulfilled.

E. Other Embodiments

E1. First Additional Embodiment

In each of the aforementioned second to fourth embodiments, the fuel cell system 10 may be able to delete the result of specification stored in the storage unit 640. The result of specification may be deleted, for example, when the position of the garage for the fuel cell-powered vehicle is changed. Besides, the result of specification may be deleted when the battery is cleared. The act of clearing the battery means a process of electrically disconnecting the battery from the fuel cell system 10 and then connecting the battery to the fuel cell system 10 again. The battery is cleared in, for example, inspecting or repairing the fuel cell-powered vehicle. In the case where the result of specification can be deleted, for example, the fuel cell system 10 according to the second embodiment can perform the decision process and the specification process even after the completion of specification. Besides, for example, the fuel cell system 10 according to the second embodiment can perform the specification process even after the completion of specification, and can perform the performance process with the plurality of the control units 600A and 600B activated respectively, in the same manner as before the completion of specification. In this case, even when the environment changes after specification, the possibility of scavenging not being carried out at an appropriate timing can be reduced.

E2. Second Additional Embodiment

In each of the aforementioned embodiments, the temperatures that are acquired by the temperature sensors 570A and 570B are used as the temperatures of the fuel cell stacks 100A and 100B respectively. However, temperatures that are acquired by temperature sensors other than the temperature sensors 570A and 570B may be used as the temperatures of the fuel cell stacks 100A and 100B respectively. For example, outside air temperature sensors, temperature sensors arranged in flow passages connected to the fuel cell stacks 100A and 100B respectively, or temperature sensors that directly acquire the temperatures of the fuel cell stacks 100A and 100B respectively may be used. In the case where different temperature sensors are used, for example, the fuel cell system 10 may correct the acquired temperatures in accordance with a correlation with the temperatures of the fuel cell stacks 100A and 100B, if necessary. Besides, for example, in the fuel cell system 10, the condition for making the determination on scavenging may be changed in accordance with the correlation between the temperatures of the fuel cell stacks 100A and 100B and the acquired temperatures.

E3. Third Additional Embodiment

In each of the aforementioned embodiments, the fuel cell system 10 is equipped with the two subsystems 10A and 10B, but the disclosure is not limited thereto. For example, the fuel cell system 10 may be equipped with three or more subsystems. In the case where the fuel cell system 10 is equipped with three or more subsystems, the control unit provided in one of the plurality of the subsystems functions as the master control unit 610. Besides, in the case where the fuel cell system 10 is equipped with three or more subsystems, the control unit of the subsystem having the fuel cell stack whose temperature is specified or decided as being the lowest among the plurality of the subsystems when the fuel cell system 10 is stopped from operating may function as the scavenging control unit.

E4. Fourth Additional Embodiment

In each of the aforementioned embodiments, the fuel cell system 10 may make a determination on winter prior to the scavenging process. The determination on winter is a process of determining whether or not the environment in which the fuel cell system 10 is used is a so-called wintertime. The wintertime is a period during which there is a temperature environment in which the water in the fuel cell stack 20 can freeze, for example, at night etc. after the vehicle is stopped. In the case where the determination on winter is made, the fuel cell system 10 may perform the scavenging process only when it is determined that the environment in which the fuel cell system 10 is used is the wintertime.

E5. Fifth Additional Embodiment

In each of the aforementioned first and second embodiments, the master control unit 610 performs the decision process as the decision unit, but the disclosure is not limited thereto. For example, the master control unit 610 may not function as the decision unit. In this case, any component other than the master control unit 610 may function as the decision unit. For example, an ECU provided separately from the control units 600A and 600B may function as the decision unit. Besides, in the second embodiment, the decision process and the specification process are performed by the master control unit 610, but the disclosure is not limited thereto. The decision process and the specification process may be performed by different components respectively. For example, the decision process may be performed by the master control unit 610, and the specification process may be performed by the ECU provided separately from the control units 600A and 600B. In this case, the two components that perform the decision process and the specification process respectively function as the decision process. In the case where the decision process and the specification process are performed by different components respectively, the decision process may be performed even after specification. In the case where the decision process is performed even after specification, the scavenging control unit may be decided in accordance with the result of specification stored in the storage unit 640, regardless of the result of the decision process.

Besides, in each of the aforementioned third and fourth embodiments, the master control unit 610 performs the specification process as the specification unit, but the disclosure is not limited thereto. For example, the master control unit 610 may not function as the specification unit. In this case, any component other than the master control unit 610 may function as the specification unit. For example, an ECU provided separately from the control units 600A and 600B may function as the specification unit.

E6. Sixth Additional Embodiment

In the case where the fuel cell system 10 of each of the aforementioned embodiments is equipped with three or more subsystems, one or some of the three or more subsystems and the other subsystem(s) may be arranged at positions that are clearly environmentally different from each other. For example, three or more subsystems may be arranged in a fuel cell-powered bus mounted with the fuel cell system 10, separately in a front region and a rear region of the vehicle. In this case, one or some of the three or more subsystems and the other subsystem(s) may either or both be equivalent to "the plurality of the subsystems" in means for solving the problem.

E7. Seventh Additional Embodiment

In each of the aforementioned embodiments, the scavenging process is performed in both the anode and the cathode, but the disclosure is not limited thereto. For example, the scavenging process may be performed in one of the anode and the cathode.

Each of the first to seventh additional embodiments also exerts an effect similar to that of each of the above-mentioned embodiments, insofar as it has a configuration similar to that of each of the above-mentioned embodiments.

The present disclosure is not limited to the above-mentioned embodiments, but can be realized in various configurations within such a range as not to depart from the gist thereof. For example, the technical features of the embodiments corresponding to the technical features in the respective modes described in the section of the summary of the disclosure can be appropriately replaced or combined with one another to partially or entirely solve the above-mentioned problem, or to partially or entirely achieve the above-mentioned effect. Besides, the technical features can be appropriately deleted unless they are described as being indispensable in the present specification.

What is claimed is:

1. A fuel cell system comprising a plurality of subsystems that are each equipped with a fuel cell stack having an anode and a cathode, a temperature sensor that acquires a temperature of the fuel cell stack, a scavenging device that scavenges at least one of the anode and the cathode, and a control unit that can command the scavenging device to carry out scavenging, wherein the control unit is programmed to, after each scavenging, determine the next remaining fuel cell stack having the lowest temperature and control the fuel cell stack having the lowest temperature to perform scavenging until all fuel cell stacks have been scavenged.

2. The fuel cell system according to claim 1, further comprising: a decision unit that performs a decision process for deciding the control unit of the subsystem having the fuel cell stack whose temperature is lowest among the plurality of the subsystems when the fuel cell system is stopped from operating, wherein the control unit decided by the decision unit among the respective control units of the plurality of the subsystems performs the scavenging control.

3. The fuel cell system according to claim 2, wherein the decision unit is provided in the control unit of one of the plurality of the subsystems.

4. The fuel cell system according to claim 3, further comprising: a storage unit that can be accessed by the decision unit and the control units of the respective subsystems, wherein upon fulfillment of a condition that the control unit of the subsystem is continuously decided through the decision process, the decision unit stores into the storage unit information specifying which one of the subsystems the control unit belongs to, and the control unit of the subsystem that is specified by the information continuously performs the scavenging control when the information is stored in the storage unit.

5. The fuel cell system according to claim 4, wherein the information stored in the storage unit is deleted when a condition determined in advance is fulfilled.

6. The fuel cell system according to claim 1, further comprising: a specification unit that performs a specification process for specifying the control unit of the subsystem having the fuel cell stack whose temperature is lowest among the plurality of the subsystems when the fuel cell system is stopped from operating; and a storage unit that can be accessed by the specification unit and the control units of the respective subsystems, wherein upon fulfillment of a condition that the control unit of the subsystem is specified through the specification process, the specification unit stores into the storage unit information specifying which one of the subsystems the control unit belongs to, and the control unit of the subsystem that is specified by the information performs the scavenging control when the information is stored in the storage unit.

7. The fuel cell system according to claim 6, wherein each of the control units of the plurality of the subsystems makes a determination on carrying out scavenging in the subsystem equipped with the control unit itself, and commands only the scavenging device of the subsystem to carry out scavenging.

8. The fuel cell system according to claim 7, wherein the control units of the plurality of the subsystems store into the storage unit additional information as information on carrying out of the scavenging, every time a command to carry out the scavenging is issued, and the specification unit determines whether or not the condition for specification through the specification process is fulfilled, through use of the temperatures of the fuel cell stacks and the additional information.

9. The fuel cell system according to claim 6, wherein the specification unit is provided in the control unit of one of the plurality of the subsystems.

10. A method of controlling a fuel cell system including a plurality of subsystems that are each equipped with a fuel cell stack having an anode and a cathode, a temperature sensor that acquires a temperature of the fuel cell stack, a scavenging device that scavenges at least one of the anode and the cathode, and a control unit that can command the scavenging device to carry out scavenging, the method comprising: causing the control unit to determine the next remaining fuel cell stack having the lowest temperature, and to control the fuel cell stack having the lowest temperature to perform scavenging until all fuel cell stacks have been scavenged.

* * * * *